US009286811B2

(12) United States Patent
VanderWel

(10) Patent No.: US 9,286,811 B2
(45) Date of Patent: Mar. 15, 2016

(54) SELECTIVELY CONCEALABLE INDICATOR SYSTEMS AND ASSEMBLIES

(71) Applicant: Kurt VanderWel, Marysville, WA (US)

(72) Inventor: Kurt VanderWel, Marysville, WA (US)

( * ) Notice: Subject to any disclaimer, the term of this patent is extended or adjusted under 35 U.S.C. 154(b) by 259 days.

(21) Appl. No.: 14/137,362

(22) Filed: Dec. 20, 2013

(65) Prior Publication Data
US 2014/0103121 A1  Apr. 17, 2014

Related U.S. Application Data

(63) Continuation of application No. 13/269,443, filed on Oct. 7, 2011, now Pat. No. 8,636,222.

(51) Int. Cl.
G06K 19/06 (2006.01)
G09F 3/00 (2006.01)
H01R 9/24 (2006.01)
G06K 19/07 (2006.01)
H01R 13/46 (2006.01)
H01R 24/78 (2011.01)

(52) U.S. Cl.
CPC .............. G09F 3/00 (2013.01); G06K 19/0723 (2013.01); H01R 9/2475 (2013.01); H01R 13/465 (2013.01); H01R 24/78 (2013.01)

(58) Field of Classification Search
USPC ....................................................... 235/492
See application file for complete search history.

(56) References Cited

U.S. PATENT DOCUMENTS

| 2,625,759 | A | * | 1/1953 | Koepke | H01R 13/465 174/66 |
|---|---|---|---|---|---|
| 2,710,382 | A | * | 6/1955 | Fitzpatrick | H01R 13/4534 174/67 |
| 5,009,610 | A | * | 4/1991 | Woskow | H01H 3/20 174/67 |
| 5,448,630 | A | * | 9/1995 | Barstow | H04M 1/67 379/199 |
| 5,727,958 | A | * | 3/1998 | Chen | H01R 13/447 174/67 |
| 5,769,653 | A | * | 6/1998 | Osterbrock | H01R 13/465 174/66 |
| 6,372,987 | B1 | * | 4/2002 | Ha | H02G 3/14 174/66 |
| 2007/0096865 | A1 | * | 5/2007 | Simske | G06Q 10/08 340/5.8 |
| 2007/0196053 | A1 | * | 8/2007 | Kewitsch | G02B 6/3825 385/74 |
| 2009/0266574 | A1 | * | 10/2009 | Atkinson | H01R 13/447 174/67 |
| 2011/0062896 | A1 | * | 3/2011 | Chou | G04G 15/006 315/362 |

* cited by examiner

Primary Examiner — Michael G Lee
Assistant Examiner — David Tardif

(57) ABSTRACT

Selectively concealable indicator assemblies configured to mount behind a wall plate, which provides an interface to interior wiring and is operatively mounted to a wall with a mounting fits tenet. The indicator assembly includes an elongate member and an indicator. The elongate member is disposed between the wall and the wall plate and configured to move between a first position substantially concealed by the wall plate and a second position where at least a portion of the elongate member extends beyond the wall plate. The indicator is disposed on the portion of the elongate member that extends beyond the wall plate when the elongate indicator is in the second position.

20 Claims, 5 Drawing Sheets

SELECTIVELY CONCEALABLE INDICATOR SYSTEMS AND ASSEMBLIES

CROSS REFERENCE TO RELATED APPLICATIONS

This application claims priority to copending U.S. application Ser. No. 13/269,443, filed on Oct. 7, 2011, which is hereby incorporated by reference for all purposes.

BACKGROUND

The present disclosure relates generally to wall plate indicator systems. In particular, wall plate indicator systems with selectively concealable indicators that display information about interior wiring routed through a wall are described.

Known wall plate indicator systems are not entirely satisfactory for the range of applications in which they are employed. For example, existing wall plate indicator systems are neither concealable nor selectively concealable. In addition, conventional wall plate indicator systems are subject to wear and tear as well as fading over time because they are not concealable. Moreover, conventional wall plate indicator systems are less aesthetically pleasing because they are not concealable, which makes them unsuitable for use in homes and other settings where aesthetics are just as important as function.

Furthermore, conventional wall plate or systems are attached directly to the wall plate such that when the wall plate is removed the indicator is also removed. This is problematic and can result in added cost to re associate the mismatched wall plate indicators with the proper circuit, and in some instances this mistake can be potentially life threatening if not remedied. For example, if a crew of painters removes all the wall plates and reinstalls the wall plates without care as to where each wall plate belongs, and then an electrician justifiable relies on the incorrect wall plate indicator, this could foreseeably lead to life threatening circumstances due to electrocution.

Thus, there exists a need for selectively concealable indicator systems that improve upon and advance the design of known wall plate indicators Examples of new and useful selectively concealable indicator systems relevant to the needs existing in the field are discussed below.

SUMMARY

The present disclosure is directed to selectively concealable indicator assemblies configured to mount behind a wall plate, which provides an interface to interior wiring and is operatively mounted to a wall with a mounting fastener. The indicator assembly includes an elongate member and an indicator. The elongate member is disposed between the wall and the wall plate and configured to move between a first position substantially concealed by the wall plate and a second position where at least a portion of the elongate member extends beyond the wall plate. The indicator is disposed on the portion of the elongate member that extends beyond the wall plate when the elongate indicator is in the second position.

DETAILED DESCRIPTION

Figure 1:
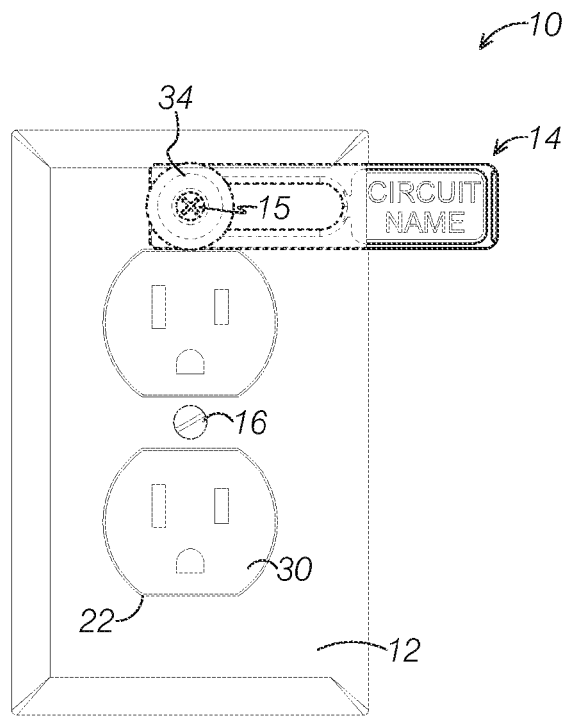
FIG. 1 is a front elevation view of a first example of a selectively concealable indicator system showing a selectively concealable indicator assembly in an extended position.

The disclosed selectively concealable indicator systems and assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various selectively concealable indicator systems and assemblies are provided. Related features in the examples may be identical, similar, or dissimilar in different examples. For the sake of brevity; related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

As described herein, a wall generally includes all the component parts generally associated with a common and it is assumed that a person having ordinary skill in the art generally understands the basic construction of a wall. Wall construction depending on residential, commercial, or industrial settings. Putting that aside, there should be commonalities or analogous construction practices between the three different settings.

A discussion of common residential wall construction follows and the reader should extrapolate these ideas to commercial and industrial settings. Residential walls typically include one or more studs spaced at various distances generally referred to as the framing. Typically, attached to the framing are one or more junction-boxes, switch boxes, receptacle boxes, and/or outlet boxes. Mud rings may then be mounted to the one or more junction-boxes, snitch boxes, receptacle boxes, and/or outlet boxes. The mud rings provide a standard hole pattern generally common to all light switches, dimmer switches, fan switches, and/or outlets. Additionally or alternatively, mud rings provide a standard hole pattern generally common to all integrated receptacles, such as data jacks, telephone jacks, Ethernet jacks, cable jacks, RCA jacks, component video jacks, HDMI jacks, DVI jacks, speaker jacks, various monitor jacks, and/or other audio and/or visual jacks.

The interior of a wall typically includes circuits wires or interior wiring, which are routed between various switch boxes, receptacle boxes, and/or outlet boxes and a circuit breaker box including one or more circuit breaker panels. The circuit breaker panels are then labeled to indicate various circuit components. Circuit breakers are analogous to reusable fuses, and may blow or create an open circuit if the load or amperage exceeds a certain value, such as 15 or 20 amps. When a circuit breaker switches from a closed circuit to an open circuit the circuit component connected to that circuit loses all power, and the circuit panel must be reset to close the circuit.

The process of closing an open circuit can be problematic and may sometimes require two or more people or several trips between the circuit breaker box and the circuit component of interest. Generally, one must go to the electrical panel to determine which circuit breaker is switched to open. Sometimes these breakers are labeled, such as circuits for lights or refrigerator, making this task easier. However, sometimes these panels are unlabeled or have many similar labels. Additionally or alternatively, a user will want to purposefully open a circum to avoid electrocution while the user works on a circuit or a device connected to the circuit. For example, a user may want to replace a light switch and/or an outlet, in these instances it would be keen to cut the power to the circuit prior to replacing either the light switch and/or outlet. Accordingly, if a user could simply look at the light switch and/or outlet of interest and determine which circuit to open this could prove to be both life saving and time saving.

With this background in mind, a first example of a selectively concealable indicator system 10 will now be described. Turning to FIGS. 1-5, selectively concealable indicator system 10 includes a wall plate 12, an indicator assembly 14, and a mounting fastener 15. Selectively concealable indicator system 10 functions to display information about interior wiring routed through a wall 18. Additionally or alternatively, selectively concealable indicator system 10 can be used to selectively display information about interior wiring routed through a wall 18.

Figure 3:
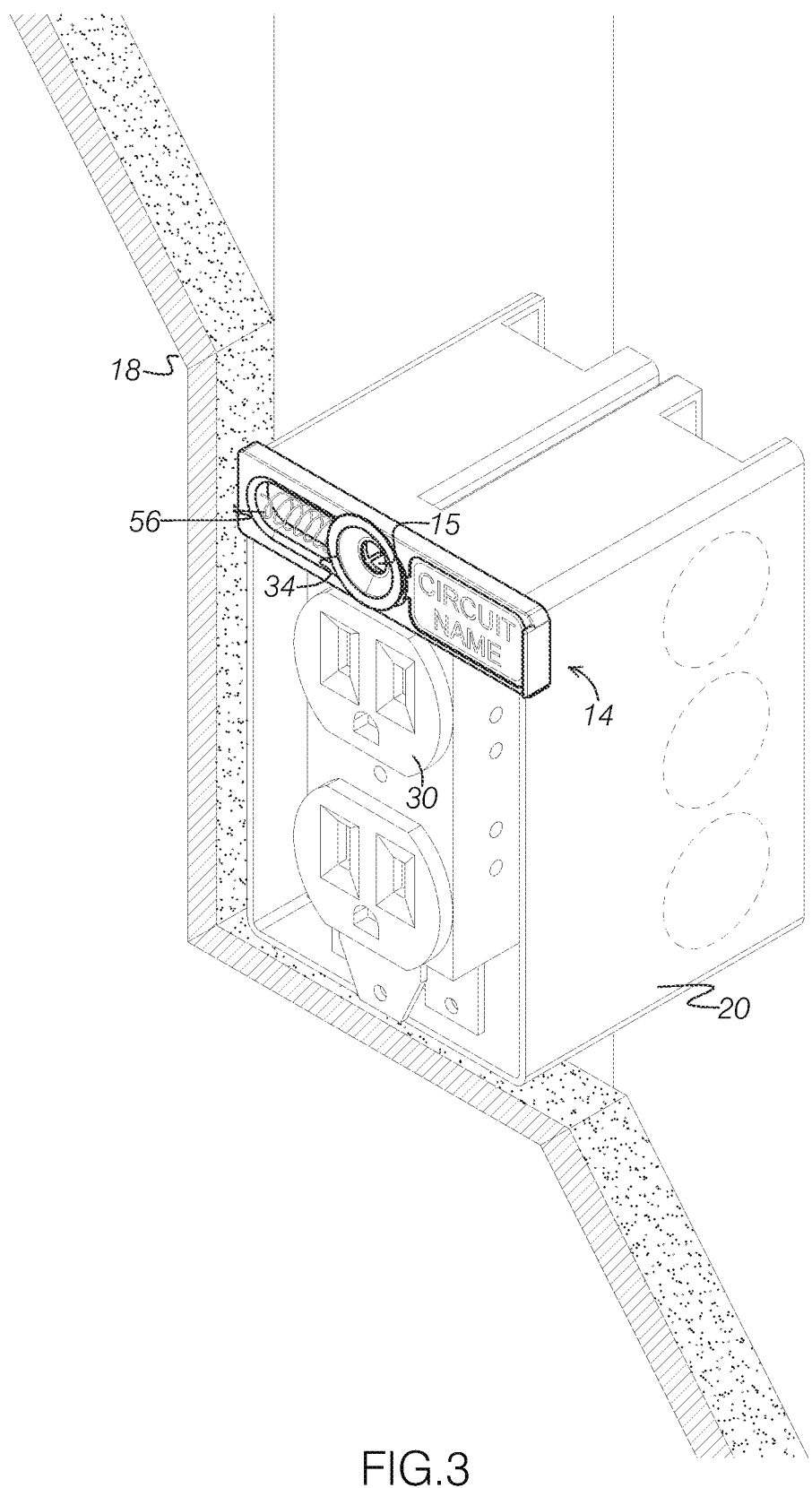
FIG. 3 is an isometric view of the selectively concealable indicator system of FIG. 1 with a wall plate removed to show a selectively concealable indicator assembly mounted to a receptacle.

As shown in FIG. 3, selectively concealable indicator system 10 mounts to a wall interface 20 fixed to wall 18. Wall interface 20 provides a standard hole pattern generally common to all light switches, dimmer switches, an switches, and/or outlets. Additionally or alternatively, wall interface 20 provides a standard hole pattern generally common to all integrated receptacles, such as data jacks, telephone jacks, Ethernet jacks, cable jacks, RCA jacks, component video jacks, HDMI jacks, DVI jacks, speaker jacks, various monitor jacks, and/or other audio and/or visual jacks. Wall interface 20 may be a mud ring, junction-box, switch box, receptacle box, outlet box, and/or some other interface that provides the standard hole pattern discussed directly above. Wall interface 20 may P made from any suitable material including plastic, metal, ceramic, and/or some other composite material.

Selectively concealable indicator system 10 may prove useful in a home setting where a user overloads a circuit and then must reset the circuit. A user could simply read the indicator and go directly to the cot-responding circuit breaker in the electrical panel and switch it from the open to closed position. In the case of older wiring where fuses are used, the indicator system may indicate fuse type in addition to the proper circuit as a time saving measure. In a commercial setting, such as a hospital, where there are multiple electrical panels at various locations throughout the building an electrician could use the indicator system to quickly locate the electrical panel and circuit breaker panel of interest, which again could be both life saving and time saving.

Additionally or alternatively, because indicator assembly is selectively concealable it reduces wear and exposure on the indicator and it is more aesthetically pleasing than an indicator that is not concealable. For instance, in home settings indicators that are not selectively concealable may de act from the aesthetics of the home, while a selectively concealable indicator assembly will go unnoticed. Further, because the indicator assembly 14 is directly mounted to a receptacle 30 using a mounting fastener 15 it limits the risk of indicator assembly 14 being misplaced or attached incorrectly to another receptacle. For example, painters typically remove wall plates prior to painting and may not realize a particular wall plate is associated with a particular circuit. Under normal circumstances this lack of care could result in a costly problem, however, if the indicator assembly is mounted directly to the receptacles, as it is in FIGS. 1-5, this lack of care is of less consequence.

Figure 2:
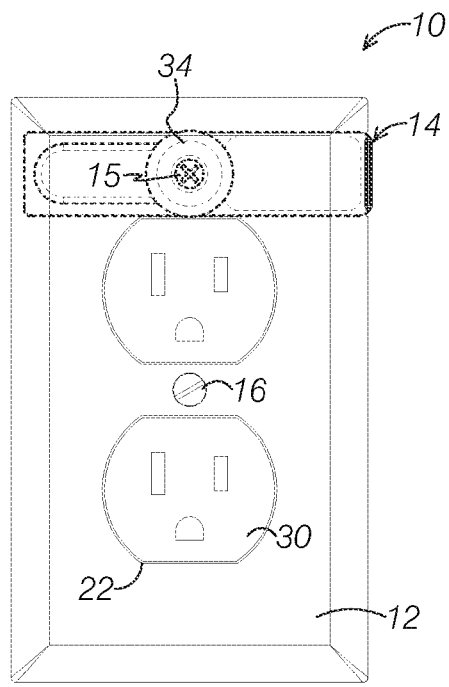
FIG. 2 is a front elevation view of the selectively concealable indicator system showing the selectively concealable indicator assembly in a concealed position.
Figure 5:
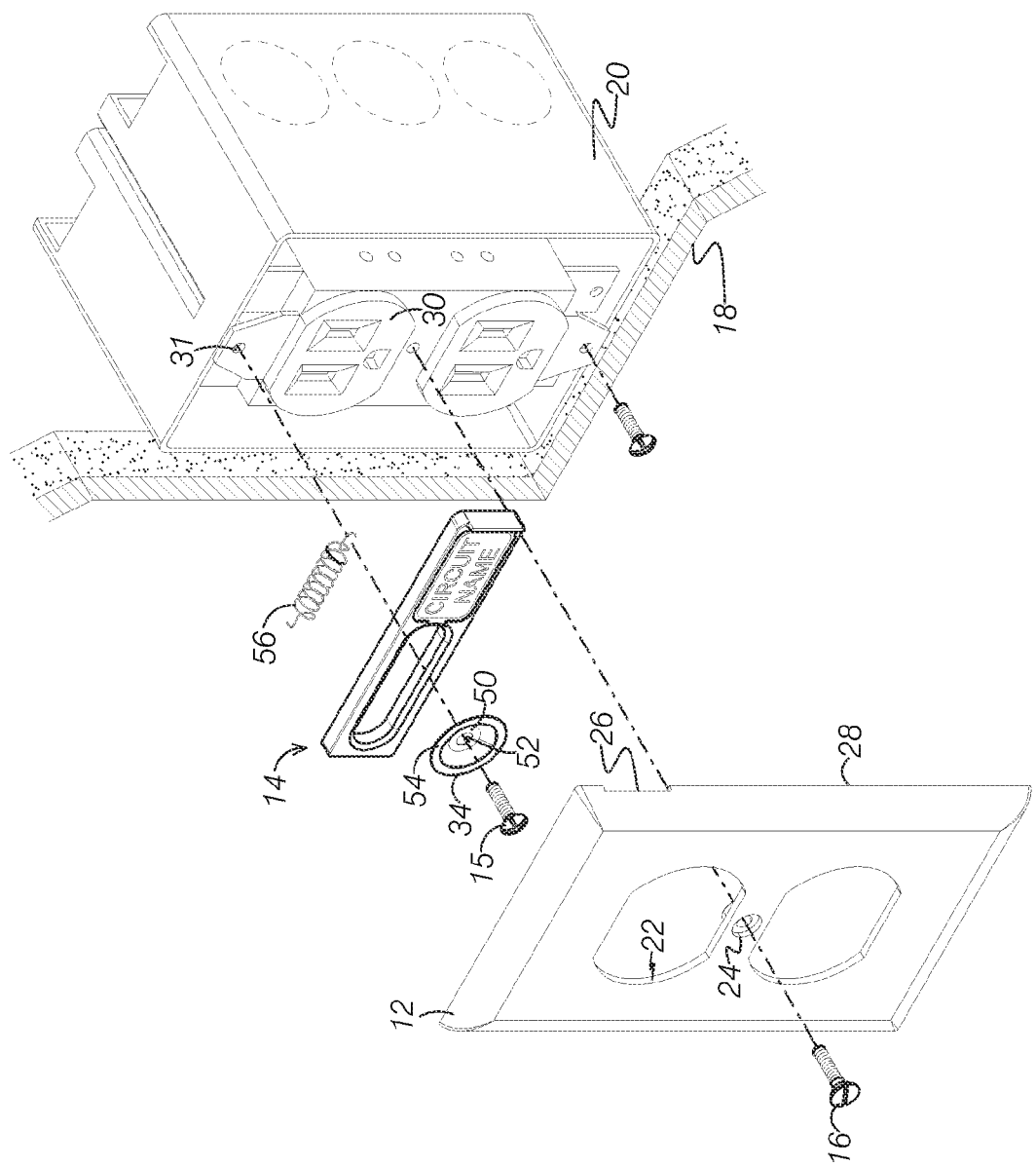
FIG. 5 is an exploded isometric view of a selectively concealable indicator system of FIG. 1.

As can be seen in FIGS. 1, 2, and 5, wall plate 12 includes receptacle openings 22, a fastener hole 24, a wall plate slot 26, and wall interface surfaces 28. It is important to note that in some embodiments the wall plate may serve as a cover receptacle and/or switch cover, while in other embodiments the wall plate may have various integrated receptacles.

For example, in some embodiments the wall plate may be used to cover light switches, dimmer switches, fan switches, outlets, and/or receptacles in general. Additionally, the wall plate may generally mount directly to light switches, dimmer switches, fan switches, outlets, and/or receptacles using one or more fasteners. Moreover, light switches, dimmer switches, fan switches, outlets, and/or receptacles may generally mount to what is known in the art as a mud ring or some other device securely mounted to either a stud located behind a wall or to the wall itself. Thus, light switches, dimmer switches, fan switches, and/or outlets may be separate from the wall plate.

On the other hand, in some embodiments the wall plate may generally include one or more integrated receptacles. For example, the wall plate may include integrated receptacles, such as data jacks, telephone jacks, Ethernet jacks, cable jacks, RCA jacks, component video jacks, HDMI jacks, DVI jacks, speaker jacks, various monitor jacks, and/or other audio and/or visual jacks. These various receptacles and jacks are integrated directly into the wall plate. Additionally, wall plates may generally mount directly to the mud ring or some other device securely mounted either to a stud located behind a wall or to the wall itself. Additionally or alternatively, some wall plates may include an integrated face plate for covering outlets and other receptacles.

Wall plate 12 may made of any suitable material including metal, wood, plastic, ceramic, and/or some other composite material. Additionally or alternatively, wall plate 12 may be cast, stamped, machined, injection molded, and/or carved.

As shown in FIGS. 1, 2, and 5, receptacle openings 22 provide access to receptacles for inserting a plug. Additionally or alternatively, the receptacle openings may provide access to light switches, dimmer switches, fan switches, outlets, other switches, and/or receptacles.

As shown in FIG. 5, fastener hole 24 is configured to receive mounting fastener 16. Some embodiments may include a plurality of fastener holes configured to receive mounting fasteners. As discussed above, in some embodiments a mounting fastener may be used to mount the wall plate, to a mud ring, while in other embodiments the mounting fastener may be used to mount the wall plate to light switches, dimmer switches, fan switches, outlets, other switches, and/or receptacles. The mounting fastener may be any suitable type of fastener, such as a screw (as shown in FIG. 1), bolt, and/or a nail. Additionally, the mounting fastener may be constructed of any suitable material, such as metal, wood, plastic, and composite material.

Figure 4:
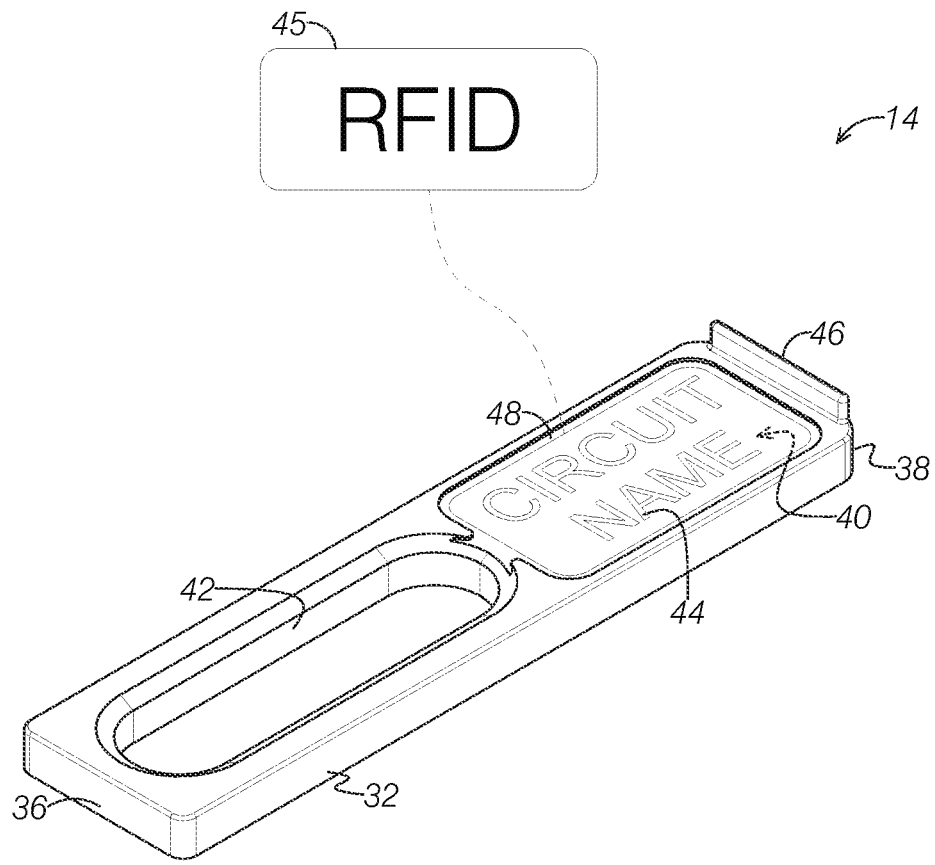
FIG. 4 is an isometric view of an elongate member of the selectively concealable indicator assembly shown in FIG. 3.

As shown in FIG. 4, wall plate 12 includes a wall plate slot 26 and wall interface surfaces 28. Wall plate slot 26 is configured to compliment indicator assembly 14 by providing sufficient clearance so that indicator assembly 14 may move relative to and selectively behind the wall plate. Wall interface surfaces 28 extend beyond wall plate slot 26, and abut or nearly abut the Turning to FIG. 1 indicator assembly 14 is shown in an extended position. In the extended position, a portion of indicator assembly 14 extends at least partially beyond wall plate 12 for viewing. In a non-extended or concealed position the indicator assembly is mostly covered or concealed by wall plate 12 such that it may not be viewable. Accordingly, indicator assembly 14 may be selectively concealable and used for selectively displaying information about the interior wiring routed through a wall. In other words, indicator assembly 14 may be selectively concealable by sliding between an extended and concealed position.

Wall plate 12 provides an interface to interior wiring and is operatively mounted to a wall with mounting fastener 16. As discussed above, the receptacle may be an outlet as shown designed to receive a plug, and/or the receptacle may be one or more of the following light switches, dimmer switches, fan switches, outlets, and/or other receptacles in general. Additionally or alternatively, as discussed above the indicator assembly may instead mount directly to a mud or some other wall mounting interface.

As shown in FIG. 4, indicator assembly 14 includes an elongate member 32. Elongate member 32 includes a first end 36, a second end 38, a mounting pad 40, an elongate slot 42, an indicator 44, and a catch 46. Elongate member 32 may be made of any suitable material, including nylon, plastic, metal, wood, and/or composite material. Additionally or alternatively, the elongate member may be injected molded, cast, machined, stamped and/or carved.

As shown in FIGS. 1-5, and perhaps most clearly in FIG. 4, mounting pad 40 is located proximate second end 38 and includes a recessed surface 48, which is recessed relative to elongate member 32. However, the mounting pad may instead be a raised surface and/or the mounting pad surface may be flush with the other surfaces of the elongate member. As shown indicator 44 mounts to mounting pad 40.

The indicator may display information about interior wiring routed through a wall. Additionally or alternatively as shown in FIGS. 1 and 3-6, indicator 44 may include indicia corresponding to electrical circuit information related to the interior wiring. For example, indicator 44 includes indicia that s human readable and depicts electrical circuit information. A variety of indicia formats are suitable such as indicia in the format following 123-A-456-01, where "123" relates to a building number, "A" relates to a closet number, "456" relates to circuit breaker panel or electrical panel number, and "01" relates to a circuit breaker number. Additionally or alternatively, the indicia may be modified to suit the type of receptacle, jack, and/or other interior wiring the indicator is associated with.

In the example shown in FIGS. 1-5, the indicator is a label that a user may print out on a printer attached to a computer or on a label maker. The label includes an adhesive surface to adhesively mount the indicator to the mounting pad. Moreover, a user may print labels at an office ahead of time based on a circuit schematic, which saves both time and money. If labels are printed ahead of time by someone other than an electrician, the hourly rate for printing may be much less than an electrician's hourly rate. Additionally or alternatively, as shown in FIG. 4 the indicator may include a machine readable component, such as a Radio Frequency identification (RFID), a bar indicia, and/or some other wireless signal.

As shown in FIGS. 1-5, indicator assembly 14 further includes an elongate slot 42 located proximate the first end. As shown, elongate slot 42 is configured to receive mounting fastener 15 and is further configured to move relative to and selectively behind wall plate 12. Indicator assembly 14 may slide over mounting fastener 15 disposed within elongate slot 42 between an extended position (shown in FIG. 1) and a concealed (non-extended) position (shown in FIG. 2) as discussed above. Additionally or alternatively, indicator assembly 14 may be configured to selectively slide out from behind wall plate 12 to one or more discreet distances from an outside edge of wall plate 12.

As shown in FIG. 4, indicator assembly 14 includes a catch 46. As shown catch 46 is located proximate second end 38 of elongate member 32. Additionally, catch 46 extends from elongate member 32 transverse to the longitudinal axis of elongate member 32 to a height sufficient to abut wall plate 12 when adjacent to wall plate 12 (in the non extended position). Thus, elongate member 32 is restricted from sliding completely past wall plate slot 26 behind all plate 12. A user may use catch 46 to selectively reveal or conceal indicator assembly 14 by pulling or pushing on catch 46, respectively. As shown, pulling on catch 46 may position indicator assembly 14 in an extended position, while pushing on catch 46 may return indicator assembly 14 to a concealed position.

As can be seen in FIGS. 1-3, and 5, indicator assembly 14 includes a spacer 34. As shown perhaps most clearly in FIGS. 1-3, spacer 34 is disposed between elongate member 32 and wall plate 12, and spacer 34 is configured to receive mounting fastener 15. As shown in FIG. 5, spacer 34 defines a first portion 50 extending in a plane and defining a hole 52 configured to receive mounting fastener 15. Additionally, spacer 34 defines a second portion 54 extending from the first portion transverse to the plane and around the periphery of the first portion 50. As shown in FIGS. 3 and 5, and perhaps most clearly in FIG. 5, mounting fastener 15 may pass through hole 52 of spacer 34, elongate slot 42 of indicator assembly 14, and receptacle hole 31 of receptacle 30 and mount to wall interface 20, thereby sandwiching spacer 34, indicator assembly 14, and receptacle 30 between mounting fastener 15 and wall interface 20.

As shown in FIGS. 3 and 5, spacer 34 and elongate slot 42 include complimentary surfaces. As shown, elongate slot 42 defines curved ends and an angled lip surface along the longitudinal axis of elongate slot 42 that continues along the curved ends of elongate slot 42 to compliment second portion 54 of spacer 34. The complimentary surfaces may allow the indicator assembly to move with less resistance between a concealed and an extended position.

With continued reference to FIGS. 3 and 5, selectively concealable indicator system 10 includes a biasing mechanism 56 that biases indicator assembly 14 to a concealed position. When user pulls on catch 46 to move indicator assembly into an extended position (non-concealed), biasing mechanism 56 biases elongate member 32 towards the concealed position such that when a user releases indicator assembly 14 it may return to the concealed position. As shown, biasing mechanism 56 includes a spring. The spring may attach to the mounting fastener and to the indicator assembly. Additionally or alternatively, as shown in FIG. 3 the spring may be sandwiched inside the elongate slot and compressed between the mounting fastener and a portion of the elongate slot.

Additionally or alternatively, the selectively concealable indicator system may include a biasing mechanism that biases the indicator assembly toward the extended position. In such examples, the indicator assembly may include a latch system to prevent the biasing mechanism from always being in the extended position. A latch system enables a user to push on the indicator assembly to release the elongate member to the extended position. To return the elongate member the user pushes the indicator assembly again it to the concealed position to engage a latch, which serves to lock the indicator assembly in the concealed position.

Figure 6:
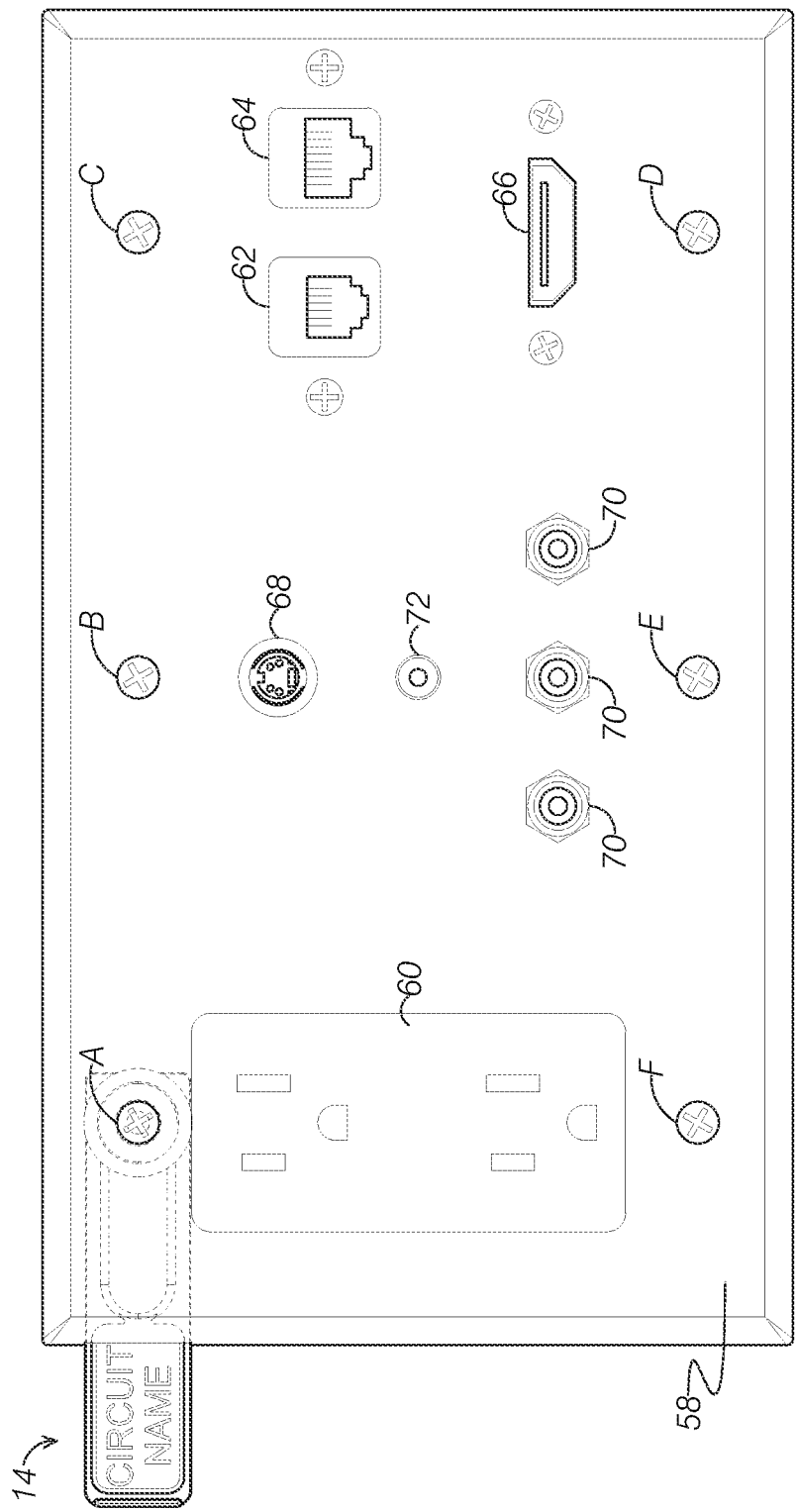
FIG. 6 is a front elevation view of a second example of selectively concealable indicator system showing a selectively concealable indicator assembly in an extended position.

Turning to FIG. 6, is shown attached to a second wall plate 58 indicator assembly 14. Wall plate 58 includes an outlet 60 along with integrated jacks. As shown, the jacks integral to the wall plate include a telephone jack 62, ethernet jack 64, HDMI jack 66, S-video jack 68, component video jack 70, and a digital audio jack 72. Each of these jacks are integrated into the wall plate. The fasteners shown for mounting wall plate near the integrated jacks may mount directly to a junction-box or mud ring. Additionally or alternatively, the fasteners for mounting the wall plate near the outlet may mount directly to the outlet. In FIG. 6, the indicator assembly 14 is shown mounted near the outlet, but indicator assemblies may be mounted at any of the six holes A-F.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A selectively concealable indicator assembly configured to mount behind a wall plate, which provides an interface to interior wiring and is operatively mounted to a wall with a mounting fastener, comprising:
    an elongate member disposed between the wall and the wall plate and configured to move between a first position substantially concealed by the wall plate and a second position where at least a portion of the elongate member extends beyond the wall plate; and
    an indicator disposed on the portion of the elongate member that extends beyond the wall plate when the elongate indicator is in the second position.

2. The selectively concealable indicator assembly of claim 1, wherein the elongate member is movingly mounted on the mounting fastener.

3. The selectively concealable indicator assembly of claim 2, wherein the elongate member defines an elongate slot, the elongate slot configured to receive the mounting fastener and to slide over the mounting fastener when the elongate member moves between the first position and the second position.

4. The selectively concealable indicator assembly of claim 3, further comprising a spacer disposed between the elongate member and the wall plate and configured to receive the mounting fastener.

5. The selectively concealable indicator assembly of claim 4, wherein the spacer defines:
    a first portion extending in a plane and defining a hole configured to receive the mounting fastener; and
    a second portion extending from the first portion transverse to the plane and around the periphery of the first portion.

6. The selectively concealable indicator assembly of claim 5, wherein the elongate slot defines an angled lip surface along the longitudinal axis of the elongate slot, the angled lip surface configured to compliment the second portion of the spacer.

7. The selectively concealable indicator assembly of claim 6, wherein the elongate slot defines curved ends and the angled lip surface of the slot continues along the curved ends of the slot to compliment the second portion of the spacer.

8. The selectively concealable indicator assembly of claim 1, wherein:
    the elongate member defines a :recess; and
    the indicator is disposed within the recess.

9. The selectively concealable indicator assembly of claim 1, wherein the indicator includes an adhesive surface to adhesively mount the indicator to the elongate member.

10. The selectively concealable indicator assembly of claim 1, wherein the indicator is a label printed with indicia by a computer printer.

11. The selectively concealable indicator assembly of claim 1, where the indicator includes indicia corresponding to electrical circuit information related to the interior wiring.

12. The selectively concealable indicator assembly of claim 1, wherein the indicator is a radio frequency identification device readable by a computer.

13. The selectively concealable indicator assembly of claim 1, further comprising biasing mechanism operatively connected to the elongate member to bias the elongate member to either the first position or to the second position.

14. An selectively concealable indicator system for selectively displaying information about interior wiring routed through a wall, comprising:
    a wall plate providing an interface to the interior wiring and operatively mounted on the wall with a mounting fastener; and
    an elongate member disposed between the wall and the wall plate and configured to move between a first position substantially concealed by the wall plate and a second position where at least a portion of the elongate member extends beyond the wall plate;
    an indicator disposed on the portion of the elongate member that extends beyond the wall plate Then the elongate indicator is in the second position.

15. The selectively concealable indicator system of claim 14, wherein the elongate member defines an elongate slot, the elongate slot configured to receive the mounting fastener and to slide over the mounting fastener when the elongate member moves between the first position and the second position.

16. The selectively concealable indicator system of claim 15, wherein the wall plate defines a wall plate slot complementarily configured with the elongate member to receive the elongate member, wherein the elongate member moves through the wall plate slot when moving between the first position and the second position.

17. The selectively concealable indicator system of claim 16, wherein the elongate member includes a catch, the catch extending from the elongate member transverse to the longitudinal axis of the elongate member to a height sufficient to abut the wall plate when adjacent to the wall plate to restrict the elongate member from sliding through the wall plate slot completely past the wall plate.

18. The selectively concealable indicator system of claim 14, wherein the indicator assembly further comprises a spacer disposed between the elongate member and the wall plate, the spacer being configured to receive the mounting fastener.

19. The selectively concealable indicator system of claim 14, wherein the elongate member is configured to selectively slide out from behind the wall plate to one or more discreet distances from an outside edge of the wall plate.

20. The selectively concealable indicator system of claim 14, wherein the interior wiring connects to an outlet mounted to the wall and the wall plate defines an outlet cover.

* * * * *